US011005129B2

(12) United States Patent
Meissner, Jr. et al.

(10) Patent No.: US 11,005,129 B2
(45) Date of Patent: *May 11, 2021

(54) SYSTEMS AND METHODS FOR CLOSED-LOOP RECYCLING OF A LIQUID COMPONENT OF A LEACHING MIXTURE WHEN RECYCLING LEAD FROM SPENT LEAD-ACID BATTERIES

(71) Applicants: Clarios Germany GmbH & Co. KGAA, Hannover (DE); CPS TECHNOLOGY HOLDINGS LLC, New York, NY (US)

(72) Inventors: Eberhard Meissner, Jr., Wunstorf (DE); Jurgen Bauer, Hildesheim (DE); Matthew A. Spence, Lindenhurst, IL (US)

(73) Assignees: Clarios Germany GmbH & Co. KGAA, Hannover (DE); CPS Technology Holdings LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/557,699

(22) Filed: Aug. 30, 2019

(65) Prior Publication Data

US 2020/0235443 A1 Jul. 23, 2020

Related U.S. Application Data

(60) Continuation of application No. 15/398,962, filed on Jan. 5, 2017, now Pat. No. 10,403,940, which is a
(Continued)

(51) Int. Cl.
*B01J 19/06* (2006.01)
*B01J 19/24* (2006.01)
(Continued)

(52) U.S. Cl.
CPC ............. *H01M 10/54* (2013.01); *B01J 6/001* (2013.01); *B01J 6/002* (2013.01); *B01J 8/008* (2013.01);
(Continued)

(58) Field of Classification Search
CPC ......... H01M 10/54; H01M 6/52; C22B 7/007; C22B 3/02; C22B 3/04; C22B 13/045;
(Continued)

(56) References Cited

U.S. PATENT DOCUMENTS 4,118,219 A 10/1978 Elmore et al.
4,220,628 A 9/1980 Kolakowski
(Continued)

FOREIGN PATENT DOCUMENTS

CA 2141906 A1 4/1996
CA 2319285 A1 3/2002
(Continued)

OTHER PUBLICATIONS

Zhu, Xinfeng; Leaching of Spent Lead Acid Battery Paste Components by Sodium Citrate and Acetic Acid; Journal of Hazardous Materials, Feb. 19, 2013; pp. 387-396.

*Primary Examiner* — Huy Tram Nguyen
(74) *Attorney, Agent, or Firm* — Boardman & Clark LLP

(57) ABSTRACT

The present disclosure relates generally to systems and methods for recycling lead-acid batteries, and more specifically, relates to purifying and recycling the lead content from lead-acid batteries. A system includes a reactor that receives and mixes a lead-beating material waste, a carboxylate source, and a recycled liquid component to form a leaching mixture yielding a lead carboxylate precipitate. The system also includes a phase separation device coupled to the reactor, wherein the phase separation device isolates the lead carboxylate precipitate from a liquid component of the
(Continued)

Figure 1:
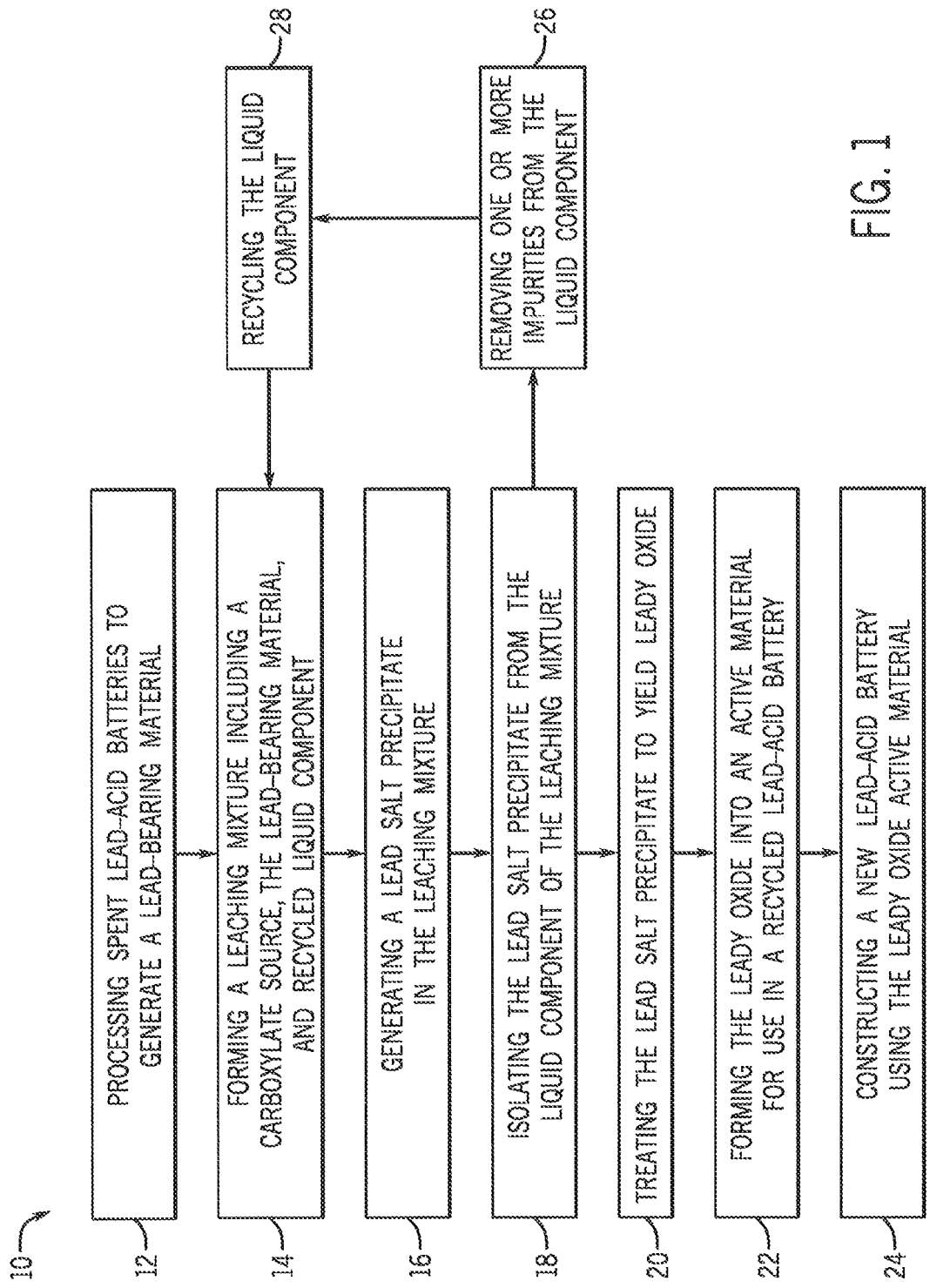

leaching mixture. The system further includes a closed-loop liquid recycling system coupled to the phase separation device and to the reactor, wherein the closed-loop liquid recycling, system receives the liquid component isolated by the phase separation device and recycles a substantial portion of the received liquid component back to the reactor as the recycled liquid component.

20 Claims, 2 Drawing Sheets

Related U.S. Application Data division of application No. 14/498,798, filed on Sep. 26, 2014, now Pat. No. 9,555,386.

(60) Provisional application No. 62/015,045, filed on Jun. 20, 2014, provisional application No. 62/015,042, filed on Jun. 20, 2014, provisional application No. 62/015,058, filed on Jun. 20, 2014, provisional application No. 62/015,070, filed on Jun. 20, 2014.

(51) Int. Cl.
*H01M 10/54* (2006.01)
*C22B 7/00* (2006.01)
*C22B 3/00* (2006.01)
*B01J 8/00* (2006.01)
*B01J 6/00* (2006.01)
*H01M 6/52* (2006.01)
*C22B 3/02* (2006.01)
*C22B 3/04* (2006.01)

(52) U.S. Cl.
CPC ........... *B01J 19/06* (2013.01); *B01J 19/2465* (2013.01); *C22B 3/02* (2013.01); *C22B 3/04* (2013.01); *C22B 7/006* (2013.01); *C22B 7/007* (2013.01); *C22B 7/009* (2013.01); *C22B 13/04* (2013.01); *C22B 13/045* (2013.01); *H01M 6/52* (2013.01); *B01J 2208/00805* (2013.01); *Y02P 10/20* (2015.11); *Y02W 30/84* (2015.05)

(58) Field of Classification Search
CPC ......... C22B 7/009; C22B 13/04; C22B 7/006; B01J 8/008; B01J 19/06; B01J 2208/00805; B01J 6/001; B01J 6/002; B01J 19/2465; Y02P 10/234; Y02W 30/84
USPC ........................................................ 422/234
See application file for complete search history.

(56) References Cited

U.S. PATENT DOCUMENTS

| | | | |
|---|---|---|---|
| 4,269,811 A | 5/1981 | Striffler, Jr. | |
| 4,336,236 A | 6/1982 | Kolakowski et al. | |
| 5,292,456 A | 3/1994 | Francis et al. | |
| 5,342,499 A | 8/1994 | Holbein et al. | |
| 5,429,661 A | 7/1995 | Khodov et al. | |
| 5,460,730 A | 10/1995 | Czerny et al. | |
| 5,514,263 A | 5/1996 | Spijkerman et al. | |
| 5,630,931 A | 5/1997 | Manequini | |
| 5,690,718 A | 11/1997 | Sabin | |
| 5,827,347 A | 10/1998 | Margulis | |
| 5,840,262 A | 11/1998 | Margulis | |
| 5,879,830 A | 3/1999 | Olper et al. | |
| 5,944,869 A | 8/1999 | Modica et al. | |
| 6,110,433 A | 8/2000 | Kleinsorgen et al. | |
| 6,150,050 A | 11/2000 | Mathew et al. | |
| 6,471,743 B1 | 10/2002 | Young et al. | |
| 7,090,760 B2 | 8/2006 | Seo et al. | |
| 7,498,012 B2 | 3/2009 | Olper et al. | |
| 7,507,496 B1 | 3/2009 | Kinsbursky et al. | |
| 7,608,178 B2 | 10/2009 | De Jonghe et al. | |
| 7,713,502 B2 | 5/2010 | Koehler et al. | |
| 7,772,452 B2 | 8/2010 | Modica | |
| 7,799,294 B2 | 9/2010 | Kordosky et al. | |
| 7,833,646 B2 | 11/2010 | Zenger et al. | |
| 8,147,780 B2 | 4/2012 | Martini | |
| 8,323,376 B2 | 12/2012 | Kumar et al. | |
| 8,323,595 B1 | 12/2012 | Smith et al. | |
| 8,562,923 B1 | 10/2013 | Smith et al. | |
| 9,555,386 B2 | 1/2017 | Meissner et al. | |
| 10,403,940 B2 * | 9/2019 | Meissner, Jr. ......... | C22B 13/045 |
| 2006/0239903 A1 | 10/2006 | Guerriero et al. | |
| 2007/0028720 A1 | 2/2007 | Sommariva et al. | |
| 2010/0040938 A1 * | 2/2010 | Kumar .................... | C22B 7/007 |
| | | | 429/49 |
| 2010/0043600 A1 * | 2/2010 | Martini ................. | C22B 13/045 |
| | | | 75/743 |
| 2010/0143219 A1 | 6/2010 | Chow | |
| 2011/0129410 A1 | 6/2011 | Trindade | |
| 2012/0128528 A1 * | 5/2012 | Langhans, Jr. .......... | C22B 3/08 |
| | | | 420/463 |
| 2012/0186397 A1 | 7/2012 | Martini | |
| 2013/0064743 A1 | 3/2013 | Laurin et al. | |

FOREIGN PATENT DOCUMENTS

| | | |
|---|---|---|
| CN | 1357938 | 7/2002 |
| CN | 1451771 | 10/2003 |
| CN | 1470675 | 1/2004 |
| CN | 1601805 | 3/2005 |
| CN | 1812183 | 8/2006 |
| CN | 101104887 | 1/2008 |
| CN | 101104890 | 1/2008 |
| CN | 101205080 | 6/2008 |
| CN | 201071389 | 6/2008 |
| CN | 101250720 | 8/2008 |
| CN | 101291008 | 10/2008 |
| CN | 101318692 | 12/2008 |
| CN | 101345328 | 1/2009 |
| CN | 101414698 | 4/2009 |
| CN | 101488597 | 7/2009 |
| CN | 101514395 | 8/2009 |
| CN | 101540395 | 9/2009 |
| CN | 101608264 | 12/2009 |
| CN | 101613803 | 12/2009 |
| CN | 101615707 | 12/2009 |
| CN | 101748277 | 6/2010 |
| CN | 101759158 | 6/2010 |
| CN | 101771181 | 7/2010 |
| CN | 101792176 | 8/2010 |
| CN | 101831668 | 9/2010 |
| CN | 101899576 | 12/2010 |
| CN | 101994007 | 3/2011 |
| CN | 102020374 | 4/2011 |
| CN | 102020375 | 4/2011 |
| CN | 102031380 | 4/2011 |
| CN | 102162034 | 8/2011 |
| CN | 102306855 | 1/2012 |
| CN | 102306856 | 1/2012 |
| CN | 102351217 | 2/2012 |
| CN | 102396099 | 3/2012 |
| CN | 102427149 | 4/2012 |
| CN | 202285265 | 6/2012 |
| CN | 102560122 | 7/2012 |
| CN | 102560535 | 7/2012 |
| CN | 103050745 | 4/2013 |
| DE | 69905134 T2 | 10/2003 |
| EP | 0905810 A2 | 3/1999 |
| EP | 1656463 A1 | 5/2006 |
| EP | 1684369 A1 | 7/2006 |
| EP | 1728764 A1 | 12/2006 |
| EP | 2182569 A1 | 5/2010 |
| EP | 2312686 A1 | 4/2011 |
| EP | 2333895 A1 | 6/2011 |
| EP | 2450991 A1 | 5/2012 |
| EP | 2604711 | 6/2013 |
| JP | H10162868 | 6/1998 |

(56) References Cited

FOREIGN PATENT DOCUMENTS

| | | |
|---|---|---|
| RU | 2298044 C2 | 4/2007 |
| RU | 2302059 C1 | 6/2007 |
| TW | 391986 | 6/2000 |
| TW | 200937702 | 9/2009 |
| WO | WO0121846 A1 | 3/2001 |
| WO | WO03025235 A1 | 3/2003 |
| WO | WO2005007904 A1 | 1/2005 |
| WO | WO2008047956 A1 | 4/2008 |
| WO | WO2008056125 A1 | 5/2008 |
| WO | WO2008087684 A1 | 7/2008 |
| WO | WO2011138996 A1 | 11/2011 |

* cited by examiner

SYSTEMS AND METHODS FOR CLOSED-LOOP RECYCLING OF A LIQUID COMPONENT OF A LEACHING MIXTURE WHEN RECYCLING LEAD FROM SPENT LEAD-ACID BATTERIES

CROSS-REFERENCE TO RELATED APPLICATIONS

This application is a continuation application of U.S. application Ser. No. 15/398,962, entitled "SYSTEMS AND METHODS FOR CLOSED-LOOP RECYCLING OF A LIQUID COMPONENT OF A LEACHING MIXTURE WHEN RECYCLING LEAD FROM SPENT LEAD-ACID BATTERIES", filed Jan. 5, 2017, now U.S. Pat. No. 10,403,940, which is a divisional application of U.S. application Ser. No. 14/498,798, entitled "SYSTEMS AND METHODS FOR CLOSED-LOOP RECYCLING OF A LIQUID COMPONENT OF A LEACHING MIXTURE WHEN RECYCLING LEAD FROM SPENT LEAD-ACID BATTERIES", filed Sep. 26, 2014, now U.S. Pat. No. 9,555,386, which claims priority from and the benefit of U.S. Provisional Application Ser. No. 62/015,045, entitled "METHODS FOR PURIFYING AND RECYCLING LEAD FROM SPENT LEAD-ACID BATTERIES", filed Jun. 20, 2014, U.S. Provisional Application Ser. No. 62/015,042, entitled "SYSTEMS AND METHODS FOR PURIFYING AND RECYCLING LEAD FROM SPENT LEAD-ACID BATTERIES", filed Jun. 20, 2014, U.S. Provisional Application Ser. No. 62/015,058, entitled "SYSTEMS AND METHODS FOR CLOSED-LOOP RECYCLING OF A LIQUID COMPONENT OF A LEACHING MIXTURE WHEN RECYCLING LEAD FROM SPENT LEAD-ACID BATTERIES", filed Jun. 20, 2014, U.S. Provisional Application Ser. No. 62/015,070, entitled "SYSTEMS AND METHODS FOR SEPARATING A PARTICULATE PRODUCT FROM PARTICULATE WASTE WHEN RECYCLING LEAD FROM SPENT LEAD-ACID BATTERIES", filed Jun. 20, 2014, each of which are hereby incorporated by reference herein in their entireties for all purposes.

BACKGROUND

The present disclosure relates generally to systems and methods for recycling lead-acid batteries, and more specifically, relates to purifying and recycling the lead content from lead-acid batteries.

The lead present in a lead-acid battery may be in a number of forms. For example, a lead-acid battery may include grids that contain lead alloys and lead oxide ($PbO$, $PbO_2$), battery paste that contains metallic lead sponge, lead oxide, red lead, and/or lead sulfate, and posts and/or interconnects that contain metallic lead, lead alloys, and which may also contain non-lead alloys. While it may be desirable to attempt to recover lead from the waste of spent or retired lead-acid batteries, this material may include a variety of lead compounds (lead alloys, oxides, sulfates and carbonates) and an array of physical and/or chemical impurities. Existing methods for purifying lead typically rely almost entirely on multi-stage pyrometallurgical smelting in which some of these compounds are combusted to produce volatile gases, some of which must be scrubbed (e.g., captured and removed from the exhaust stream) to prevent release, in accordance with environmental regulations, and subsequently the remaining impurities are removed from the metallic lead in various refining operations. Since these operations often require specialized equipment and certain consumables (e.g., solutions or other refining agents), this refinement process generally adds cost and complexity to the lead recovery process.

SUMMARY

The present disclosure relates to systems and methods by which lead from spent lead-acid batteries may be extracted, purified, and used in the construction of new lead-acid batteries. In an embodiment, a system includes a reactor that receives and mixes a lead-bearing material waste, a carboxylate source, and a recycled liquid component to form a leaching mixture yielding a lead salt precipitate. The system also includes a phase separation device coupled to the reactor, wherein the phase separation device isolates the lead salt precipitate from a liquid component of the leaching mixture. The system further includes a closed-loop liquid recycling system coupled to the phase separation device and to the reactor, wherein the closed-loop liquid recycling system receives the liquid component isolated by the phase separation device and recycles a substantial portion of the received liquid component back to the reactor as the recycled liquid component.

In another embodiment, a method includes forming a leaching mixture having a lead-bearing material, a carboxylate source, and a recycled liquid component, wherein the leaching mixture generates a lead salt precipitate as the carboxylate source reacts with the lead-bearing material. The method also includes isolating a liquid component from the lead salt precipitate of the leaching mixture. The method further includes recycling at least a portion of the isolated liquid component back into the leaching mixture as the recycled liquid component.

In another embodiment, a system includes a closed-loop liquid recycling system coupled to a leaching vessel that contains a leaching mixture. The liquid recycling system receives a liquid component of the leaching mixture purifies the received liquid component to generate a purified liquid component having a lower sulfate content than the received liquid component, and provides the purified liquid component to the leaching vessel as part of the leaching mixture.

DRAWINGS

Figure 2:
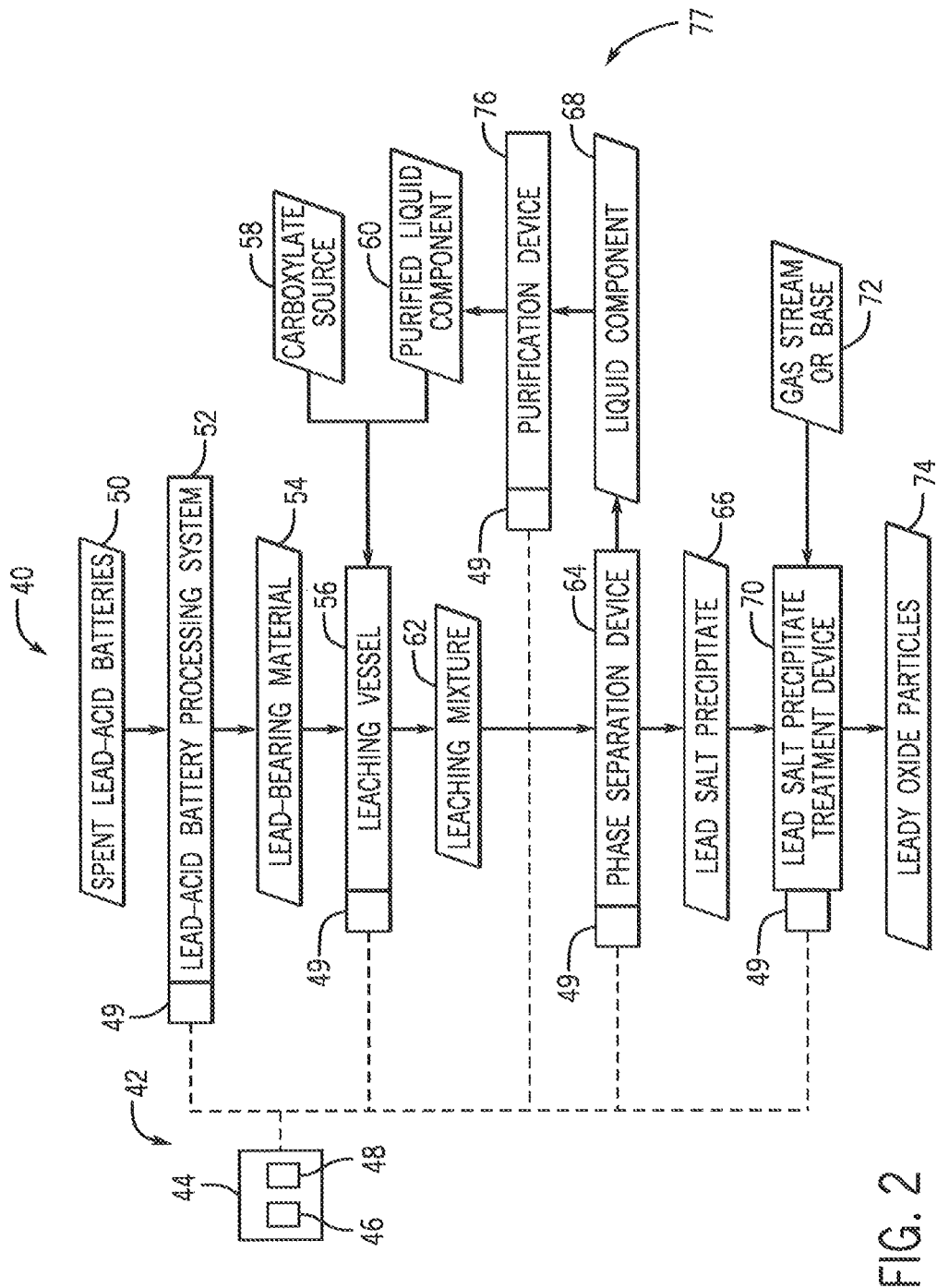

FIG. 1 is a flow diagram illustrating an embodiment of a process by which lead from spent lead-acid batteries may be extracted, purified, and used in the construction of new lead-acid batteries; and FIG. 2 is a schematic of an embodiment of a system for performing the process of FIG. 1.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and the are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the disclosure of a particular component being made of or including a particular element called out by name (e.g, lead), should be interpreted to encompass all forms of lead (e.g., metallic lead, lead compounds, or mixtures thereof). For distinction, as used herein, the disclosure of a metallic form of an element may be indicated by the chemical formula (e.g., Pb(0)) or using the terms elemental, metallic, or free (e.g., elemental lead, metallic lead, or free lead). As used herein, "leady oxide" may be used to indicate a mixture of metallic lead (e.g, Pb(0)) and lead oxide (e.g., PbO) in various ratios as described. As used herein, the term "substantially free" may be used to indicate that the identified component is not present at all, or is only present in a trace amount (e.g., less than 0.1%, less than 0.01%, or less than 0.001%). As used herein, "an element or compound of Group X" may refer to any chemical substance (e.g., element or compound) that includes an element from the identified column of the periodic table. For example, "an element or compound of Group 14" may include any of the elements from Group 14 (e.g., carbon, silicon, tin, etc.) as well as any compounds that include Group 14 elements (e.g., carbonates, silicates, stannates, etc). As used herein, a "carboxylate source" is any molecule or polymer that includes at least one carboxylate or carboxylic acid moiety or functionality. Accordingly, a non-limited list of example carboxylate sources include: citric acid, acetic acid, formic acid, citrate, acetate, formate, dilactate, oxalate, tartarate, or any combination thereof. The term "citrate" herein refers to citric acid, or a citrate salt of a Group 1 or Group 2 metal, or ammonium citrate. The term "acetate" herein refers to acetic acid, or acetate salts of a Group 1 or Group 2 metal, or ammonium acetate. "New lead-acid battery" herein refers to a newly produced lead acid battery, while the term "spent lead-acid battery" indicates a battery at the end of its useable service life. As used herein "peroxide" refers to hydrogen peroxide and/or any organic peroxide (e.g. peracetic acid). The term "hydroxide" herein indicates a Group 1 or Group 2 metal hydroxide, ammonium hydroxide, or ammonia gas introduced into the reaction mixture to form ammonium hydroxide in-situ, or combinations thereof.

As mentioned above, existing methods typically rely heavily on pyrometallurgical smelting or combustion to recover and purify lead from spent lead-acid batteries. For such methods, the lead-bearing material from spent lead-acid batteries, which may include a number of lead compounds and a number of impurities, may be heated such that at least a portion of the impurities may combust or volatilize and be released as byproducts. Additionally, after pyrometallurgical smelting or combustion of the lead-bearing material, such methods may involve subsequent refinement steps to remove byproducts or other impurities to yield purified lead. Since the atmospheric release of some of these combustion by products (e.g, $SO_2$, soot) may be restricted by local environmental regulations, present embodiments are directed toward enabling a solution-based removal of several impurities from the recovered lead, thereby avoiding or reducing the formation of such combustion byproducts and/or the cost associated with scrubbing them from the exhaust stream. Additionally, present embodiments address limitations of other waste lead purification techniques, enabling a robust technique for purifying and recycling of recovered lead on an industrial scale. Moreover, as discussed in detail below, present embodiments enable the closed-loop recycling of the liquid component of the leaching solution used during the lead recovery and purification process, which both enhances lead recovery and avoids potentially costly waste disposal of this liquid component. Accordingly, present embodiments enable a lead recovery and purification technique that is robust to the presence of a wide variety of impurities, improves lead recovery, and, limits the production of byproducts that may be costly to properly purify and discard.

FIG. 1 is a flow diagram illustrating an embodiment of a process 10 by which lead from spent lead-acid batteries may be extracted, purified, and used in the construction of new lead-acid batteries. It may be appreciated that the process 10 of FIG. 1 is merely provided as an example and, in other embodiments, the process 10 may include additional purification steps (e.g., additional hydrometallurgical putification steps, additional phase-, size- or density-based separation steps, additional pH adjustment steps) in accordance with the present disclosure. As illustrated in FIG. 1, the process 10 begins with the processing (block 12) of spent lead-acid batteries to generate a lead-bearing material. For example, in an embodiment, one or more lead-acid batteries may be fed through a hammer mill or another suitable device that is capable of crushing, pulverizing, grinding, or otherwise physically digesting the entirety of the spent lead-acid battery. The components of the spent lead-acid battery may include, for example, metal posts, metal connectors, metal grids, carbon black, glass, a plastic or metal casing, plastic separators, plastic fibers, lignosulphonates or other organic expanders, battery paste (e.g., including various lead oxides, lead carbonates, lead sulfates), sulfuric acid, among other components (e.g., non-lead-based metal components, such as, brass terminals). The lead present in the spent lead acid battery may be in a number of different forms, including, for example, $PbO_2$, PbO, $PbSO_4$, $PbCO_3$, and Pb(0).

After being substantially pulverized, the resulting battery waste may, in certain embodiments, be passed through one or more preliminary purification steps in which certain components (e.g., the crushed plastic components) may be removed from the remainder of the lead-bearing mixture, for example, using a separation device (e.g., a settling tank or cyclone separator) that takes advantage of the lower density of these plastic components. For example, in certain embodiments, sieving may be applied as a separation step to separate massive metal particle fractions from other portions of the battery waste. Further, in certain embodiments, some, or all, of the residual sulfuric acid entrained in the lead-bearing material may be recycled for reuse, or neutralized and crystallized as a solid sulfate for disposal or resale. In certain embodiments, pre-treatment of the lead-bearing material may include a full or partial desulfurization stage in which the sulfate content of the lead-bearing material may be reduced by chemical means, for example, by treatment with a hydroxide (e.g., sodium hydroxide) or carbonate (e.g, soda ash). Each of these actions or steps may be generally represented by block 12.

The illustrated method 10 continues with forming (block 14) a leaching mixture that includes the lead-bearing material generated in block 12 (which may include all of the battery waste, or a separated fraction thereof, as discussed above), a carboxylate source, and a recycled liquid component. The recycled liquid component is or may be formed from an aqueous solution that is isolated during a later step (block 18) of the method 10, as discussed in greater detail below. In block 14, the recycled liquid component may be partially or entirely saturated with a dissolved lead salt, (e.g, lead citrate, lead acetate, and/or other lead salts), and may generally provide a medium for the leaching of the lead-bearing material. In certain embodiments, the carboxylate source may be metal citrate (e.g., sodium citrate), citric acid, metal acetate (e.g., sodium acetate), acetic acid, a combination thereof, or any other suitable carboxylate source that may drive the formation of lead salts in the leaching mixture. In certain embodiments, water and/or peroxide may be added to the leaching mixture as well to encourage the dissolution of solid lead and the formation of lead salts (e.g., lead citrate, lead acetate) in the leaching mixture. In certain embodiments, sodium hydroxide or sodium carbonate may be added to the mixture, or sodium citrate may be used as at least a portion of the carboxylate source, to encourage the formation of sodium sulfate from lead sulfate that may be present in the leaching mixture.

In certain embodiments, block 14 may be performed in a reactor, such as a leaching tank, at low (acidic) pH (e.g., pH between 1 and 7) and at slightly elevated temperatures (e.g., approximately 30° C. or more). It may be appreciated that this leaching mixture may include both soluble and insoluble residuals from the spent and digested batteries. Additionally, the carboxylate source reacts with one or more forms of lead in the leaching mixture (e.g., metallic lead, lead sulfate, lead carbonate, and lead oxide), with or without the assistance of a peroxide, to yield one or more lead salts. Since these lead salts may have limited solubility at low pH levels, a lead salt precipitate (e.g., a lead citrate precipitate, a lead acetate precipitate) may be generated (block 16) in the leaching mixture as a result. Further, as discussed below, the lead salt dissolved in the recycled liquid component may encourage the generated lead salt to precipitate within the leaching mixture.

Subsequently, the lead salt precipitate may be isolated (block 18) from the liquid component of the leaching mixture, for example, by filtration. After being separated from the liquid component of the leaching mixture, the lead salt precipitate may be washed with water, and the filtrate and wash water may retain all or most of the remaining impurities from the lead salt precipitate. For example, in certain embodiments, the isolated lead salt precipitate may include little or no residual sulfates (e.g., sodium sulfate and/or lead sulfate), such as less than 5% sulfates, less than 4% sulfates, less than 3% sulfates, less than 2% sulfates, less than 1% sulfates, less than 0.5% sulfates, less than 0.3% sulfates, or less than 0.1% sulfates. Recycling of the liquid component (and the wash-water) is discussed in greater detail below.

Next in the illustrated process 10, the lead salt precipitate may be treated (block 20) to yield leady oxide. For example, in certain embodiments, the treatment of block 20 may involve treating the isolated lead salt precipitate with base (e.g., hydroxide, 25-50 wt % sodium hydroxide solution) to yield the leady oxide product. In certain embodiments, the treatment of block 20 may involve a calcination treatment performed using a belt-dryer, a spray calciner, a stirred pot reactor, a rotary kiln, or another suitable calciner or kiln. For embodiments utilizing a calcination treatment, the lead salt precipitate may be heated to a temperature less than 450° C. (e.g., between approximately 275° C. and approximately 400° C., at approximately 330° C.). In certain embodiments, this heating may occur in the presence of a gas stream (e.g. air, oxygen-enriched air, oxygen-reduced air, air/inert gas mixtures, water steam) such that the organic portion of the carboxylate source combusts, resulting in a mixture of free lead (i.e., Pb(0)) and lead oxide (i.e., PbO), generally referred to as leady oxide. Since the carboxylate source structure includes a substantial amount of oxygen, in certain embodiments calcination may occur while combusting an oxygen reducer (e.g., methane, coke, propane, natural gas, etc.) to limit the amount of oxygen present during the calcination process to control the chemistry of the leady oxide product. For such embodiments, examples of process controls that may affect the resulting leady oxide include the temperature of the calcination, time, droplet size (e.g., for spray calcination), lead salt particle size, how much residual water remains in the lead salt, the rate at which the lead salt is heated to the calcination temperature, and/or oxygen content in the gas stream.

The illustrated process 10 continues with the leady oxide produced from the treatment of block 20 being formed (block 22) into a leady oxide active material for use in new lead-acid batteries. For example, the leady oxide may be mixed with water and sulfuric acid to form a battery paste that may be applied to a plurality of lead grids to serve as the active material of a new lead-acid battery. Accordingly, a new lead-acid battery may be constructed (block 24) using the leady oxide battery paste formed in block 22. The toady oxide active material formed by the present approach may enable the production of new lead-acid batteries having good to excellent electrical performance. The leady oxide formed in block 20 may also be used to manufacture tribasic lead sulfate (3BS), tetra basic lead sulfate (4BS), and red lead (lead (II,IV) oxide, $Pb_3O_4$). In the case of 3BS and 4BS, the materials may be produced by mixing the leady oxide formed in block 20 with water and sulfuric acid using a mixer. In the case of red lead, the material may be formed by further treating (e.g., calcining and/or oxidizing) the leady oxide formed in block 20. All of these materials are useful in the construction of new lead-acid batteries, or for other suitable technical purposes.

Further, it may be appreciated that, while the isolated liquid component of the leaching mixture, as well as any water washes, contain certain contaminants (e.g., sulfates or salts of elements other than lead) that are desirably separated from the lead salt precipitate in block 18, this isolated liquid component also includes a substantial amount of dissolved lead salt. That is, while the solubility of the lead salt in the leaching mixture of block 16 may be low (e.g., due to the pH of the leaching mixture and/or the amount of lead salt present in the leaching mixture), a certain amount of lead salts (e.g., lead citrate, lead acetate) will remain dissolved in the liquid component after the lead salt precipitate is isolated in block 18. Indeed, in certain embodiments, this isolated liquid component may be partially or completely saturated with lead salt (e.g., at least 5% saturated, at least 10% saturated, or at least 15% saturated with lead salts, up to 100% saturated in lead salts) and may also include other impurities (e.g., lead sulfate, sodium sulfate, or other salts of elements other than lead). As such, if the liquid component were to be discarded, a substantial amount of purification (e.g., lead removal, sulfate removal, etc.) would likely be performed, and a substantial amount of lead would be lost as well. By recycling the isolated liquid component back into the leaching mixture in block 14 in a closed-loop manner, the aforementioned high concentration of dissolved lead salt (e.g., lead citrate, lead acetate) in this recycled liquid component encourages the additional lead salt generated in block 16 to precipitate, rather than remaining dissolved in the leaching mixture. Accordingly, in addition to avoiding costly purification and disposal steps, the presently disclosed recycling of the liquid component of the leaching mixture increases the yield of the lead salt precipitate isolated in block 18 and the overall efficiency of the method 10.

With the foregoing in mind, the method 10 illustrated in FIG. 1 includes steps whereby the liquid component isolated in block 18 may be recycled back into the leaching mixture of block 14, limiting the production of waste and improving lead recovery. As illustrated in FIG. 1, the liquid component isolated in block 18, which may or may not include the water from one or more washes, may be purified (block 26) to remove one or more impurities from the liquid component before the liquid component is recycled (block 28) into the mixture of block 14. For example, in certain embodiments, it may be desirable to remove or reduce the sulfate content (e.g., sodium sulfate, lead sulfate, salts of elements other than lead, etc.) in the liquid component before it is recycled back into the leaching mixture of block 14. By specific example, in certain embodiments, the purification of block 26 may include a chemical purification (e.g., forming insoluble calcium sulfate from other sulfates using calcium hydroxide), physical purification (e.g., reverse osmosis or nanofiltration), and/or ion exchange resins. It may be appreciated that, in certain embodiments, the purification described by block 26 preferably removes the one or more impurities from the liquid component without substantially altering the amount of lead salt (e.g., lead citrate, lead acetate) dissolved in the liquid component. Further, in certain embodiments, the liquid component isolated in block 18 does not receive the purification described by block 26 and may, instead, be directly recycled (block 28) into the leaching mixture of block 14.

FIG. 2 illustrates an embodiment of a system 40 configured to perform the process illustrated in FIG. 1 in what may be referred to as a continuous manner. In certain embodiments, some or all of the illustrated system 40 may be implemented as a multi-stage reactor system, or a series of individual reactors and devices to enable the continuous processing of spent lead-acid batteries into leady oxide particles. In addition to these devices, stages, and/or reactors (illustrated as rectangles) in the system 40, FIG. 2 also illustrates the various inputs and outputs (illustrated as non-rectangular parallelograms) for each device in the system 40. The illustrated system 40 of FIG. 2 has a control system 42 that includes a controller 44 (e.g., a programmable logic controller (PLC)). The controller 44 includes a memory 46 and a processor 48, which enable the controller 44 to store and execute instructions (e.g., applications, modules, apps, firmware) to control operation of the system 40 via field devices 49. For examples, field devices 49 may include any number of sensing devices (e.g., temperature sensors, pressure sensors, flow rate sensors, oxygen sensors, particle size sensors, rotational speed sensors, pH sensors) that are disposed throughout the system 40 and are communicatively coupled to the controller 44 (e.g., via a wired or wireless communication channel) to enable the controller 44 to determine the operational parameters of the system 40. Further, the field devices 49 may include any number of control devices (e.g., actuators, valves, motors, pumps, screws, heating elements, compressors) configured to receive control signals from the controller 44 and modulate the operation or state of the system 40 accordingly.

With the foregoing in mind, the illustrated system 40 includes a lead-acid battery processing system 52 that receives spent lead-acid batteries 50 and generates a lead-bearing material 54. As such, the lead-acid battery processing system 52 performs the acts described by block 12 of the process 10 illustrated in FIG. 1. As mentioned above, this lead-acid battery processing system 52 may include a hammer mill or another suitable device that is capable of receiving entire lead-acid batteries (e.g., via a feed chute) and grinding the lead-acid batteries into particulate battery waste. Additionally, as mentioned above, the lead-acid battery processing system 52 may include some preliminary purification features to remove one or more components from the resulting battery waste. For example, in certain embodiments, the lead-acid battery processing system 52 may include a cyclone separation device that receives the particulate battery waste exiting the hammer mill, and may separate lower density battery waste (e.g., plastic components from the housing of the lead-acid batteries) from the higher-density lead-bearing material 54, which may subsequently be advanced to the next device (e.g., leaching vessel 56) in the illustrated system 40. Also, as mentioned above, sieving may be applied to separate massive metal partide fractions from other fractions of the battery waste.

The system 40 illustrated in FIG. 2 includes a leaching vessel 56 that is configured to perform the acts described in blocks 14 and 16 of the process 10 illustrated in FIG. 1. The leaching vessel 56 may be a reactor or a stage of a multi-stage reactor (e.g., a leaching tank or reactor) that receives the lead-bearing material 54 from the lead-acid battery processing system 52 and adds a carboxylate source 58 (e.g., citric acid, sodium citrate, acetic acid, sodium acetate, or a combination thereof) and a purified, recycled liquid component 60 (e.g., a solution that is at least partially saturated in lead salts) to form a leaching mixture 62. In certain embodiments, the leaching vessel 56 may also add a peroxide, a hydroxide, acetic acid, and/or sodium carbonate to the leaching mixture 62 to drive the formation of lead salt from the lead-bearing material. In certain embodiments, the leaching vessel 56 may also be capable of both providing temperature control (e.g., heating and/or cooling to between approximately 30° C. to 100° C.) and agitation (e.g., mixing and/or stirring) of the mixture to facilitate formation of the lead salt precipitate in the leaching mixture 62. Accordingly, the leaching vessel 56 may produce (e.g., store, contain, or output) the leaching mixture 62, which includes the formed lead salt precipitate and the remainder of the lead-bearing material. This leaching mixture 62 may subsequently be advanced to the next device (e.g., phase separation device 64) in the illustrated system 40.

The system 40 illustrated in FIG. 2 includes a phase separation device 64 that is configured to perform the acts described in block 18 of the process 10 illustrated in FIG. 1. In certain embodiments, the phase separation device 64 may include a filter press, a clarifier, a cyclone separator, a settling tank, a belt dryer, or any other device capable of separating components of the leaching, mixture 62 based on phase, density, and/or size. As such, the phase separation device 64 receives the leaching mixture 62 and separates the solid lead salt precipitate 66 from the liquid component 68. Subsequently, the isolated lead salt precipitate 66 may advance to the next device (e.g., lead salt precipitate treatment device 70) in the illustrated system 40 and eventually provide the leads oxide particles 74, as discussed below.

For the illustrated embodiment, the liquid component 68 isolated by the phase separation device 64, which includes dissolved lead, salt as well as dissolved impurities (e.g., lead sulfate, sodium sulfate, salts of elements other than lead), is subsequently delivered to the purification device 76 of the closed-loop liquid recycling system 77. The purification device 76 is configured to perform the acts described in block 26 of the process 10 illustrated in FIG. 1. By specific example, in certain embodiments, the purification device 76 may include a reactor that adds calcium hydroxide to the liquid component 68, and a phase separation device (e.g., a filter press, a clarifier, a settling tank) that removes the resulting insoluble calcium sulfate the liquid component 68 to produce (e.g., store, contain, or output) the purified liquid component 60. In other embodiments, the purification device 76 may include a nanofiltration device and/or one or more ion exchange resins to facilitate the removal of one or more impurities (e.g., sulfates) from the liquid component 68 to produce (e.g., store, contain, or output) the purified liquid component 60 having substantially less sulfates. Subsequently, the purified liquid component 60, still at least partially (e.g., at least 10%) saturated in lead salts, may be recycled into the leaching mixture 62 within the leaching vessel 56. It may also be appreciated that, in other embodiments, the closed-loop liquid recycling system 77 may not include the purification device 76 (or may bypass the purification device 76) and the liquid component 68 isolated by the phase separation device 64 may be directly recycled back into the leaching mixture 62 within the leaching vessel 56 without purification. It may be appreciated that recycling the liquid component in a closed-loop manner, as presently illustrated, reduces or eliminates additional purification and disposal steps while increasing the lead recovery of the system 40.

The system 40 illustrated in FIG. 2 includes a lead salt precipitate treatment device 70 that is configured to perform the acts described in block 20 of the process 10 illustrated in FIG. 1. In certain embodiments, the lead salt precipitate treatment device 70 may include a reactor that mixes the isolated lead salt precipitate 66 with base 86 (e.g., a hydroxide, 25-50 wt % sodium hydroxide solution) to yield the leady oxide product 74. In certain embodiments, the lead salt precipitate treatment device 70 may be a calciner (e.g., a belt dryer, a batch calciner, an oven, a spray calciner, a rotary kiln calciner, a spray pyrolysis reactor, a stirred pot reactor, or another suitable calcination device). As such, the lead salt precipitate treatment device 70 receives the lead salt precipitate 66 isolated by the phase separation device 64 and reacts the lead salt precipitate 66 with a gas stream (e.g., air, oxygen-enriched air, oxygen-reduced air, nitrogen/air mixtures, water steam) or base 72 (e.g., hydroxide) to form leady oxide particles 74. For example, in certain embodiments, the lead salt precipitate treatment device 70 may calcine the lead salt precipitate 66 in a mixture of air and an oxygen-reducing agent (e.g., carbon based materials such as methane, coke, propane, natural gas, etc.) to provide an oxygen-poor environment to calcine the lead salt precipitate 66 into the desired leady oxide product 74. The leady oxide particles 74 may subsequently be used to form a leady oxide active material for the construction of new lead-acid batteries (e.g., as discussed in blocks 22 and 24 of the process 10 in FIG. 1). As mentioned above with respect to the process 10, the leady oxide produced by the illustrated system 40 enables the production of new lead-acid batteries having good to excellent electrical performance.

One or more of the disclosed embodiments, alone or on combination, may provide one or more technical effects useful in the recovery of lead from spent lead-acid batteries. Embodiments of the present approach enable the industrial scale extraction and purification of lead from spent lead-acid batteries. Further, present embodiments enable the removal of several impurities (e.g., insoluble impurities, sulfates, alloying metals) from the recovered lead, thereby avoiding or reducing the formation of certain undesired combustion byproducts as well as the cost associated with scrubbing these byproducts from the exhaust stream. Accordingly, present embodiments enable continuous lead purification techniques that are robust to the presence of a wide variety of impurities and provide enhanced control over the parameters of the purification process. Moreover, present embodiments enable the recycling of the liquid component of the leaching mixture during the lead recovery and purification process, which both enhances lead recovery and avoids potentially costly waste disposal. The technical effects and technical problems in the specification are exemplary and are not limiting. It should be noted that the embodiments described in the specification may have other technical effects and can solve other technical problems.

While only certain features and embodiments of the disclosure have been illustrated and described, many modifications and changes may occur to those skilled in the art (e.g., variations in sizes, dimensions, structures, shapes and proportions of the various elements, values of parameters (e.g., temperatures, pressures), mounting arrangements, use of materials, colors, orientations) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out the invention, or those unrelated to enablimg the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A system, comprising:
    a reactor that receives and mixes lead-bearing material, a carboxylate source, and a recycled liquid component to form a leaching mixture yielding a lead carboxylate precipitate;
    a phase separation device coupled to the reactor, wherein the phase separation device isolates the lead carboxylate precipitate from a liquid component of the leaching mixture;
    a calciner coupled to the phase separation device and configured to receive the lead carboxylate precipitate isolated by the phase separation device and treat the lead carboxylate precipitate to yield leady oxide; and
    a closed-loop liquid recycling system coupled to the phase separation device and to the reactor, wherein the closed-loop liquid recycling system receives the liquid component isolated by the phase separation device and recycles a substantial portion of the received liquid component back to the reactor as the recycled liquid component.

2. The system of claim 1, wherein the closed-loop liquid recycling system comprises a purification device that removes at least one impurity from the received liquid component before recycling.

3. The system of claim 2, wherein the purification device comprises:
 another reactor that mixes calcium hydroxide with the received liquid component; and
 another phase separation device that subsequently removes a resulting calcium sulfate precipitate from the received liquid component before recycling.

4. The system of claim 1, wherein the carboxylate source comprises citric acid, a salt of citric acid, ammonium citrate, or a combination thereof.

5. The system of claim 1, wherein the recycled liquid component is a solution at least 10% saturated in dissolved lead carboxylate.

6. The system of claim 1, wherein the closed-loop liquid recycling system receives wash water along with the liquid component from the phase separation device and recycles the wash water along with the liquid component.

7. The system of claim 1, comprising a lead-acid battery processing device that is configured to receive at least one lead-acid battery and grind the at least one lead-acid battery into the lead-bearing material.

8. The system of claim 1, wherein the calciner comprises a heat source configured to heat the lead carboxylate precipitate to a temperature less than or equal to 450° C.

9. The system of claim 1, wherein the system includes process controls selected from the group consisting of temperature of calcination, time, droplet size, lead salt particle size, amount of residual water in the lead salt, rate of heating of the lead salt to the calcination temperature, and oxygen temperature in a gas stream.

10. A system, comprising:
 a reactor that receives and mixes lead-bearing material, a carboxylate source, and a recycled liquid component to form a leaching mixture yielding a lead carboxylate precipitate;
 a phase separation device coupled to the reactor, wherein the phase separation device isolates the lead carboxylate precipitate from a liquid component of the leaching mixture;
 a purification device coupled to the phase separation device and configured to receive the liquid component, wherein the purification device removes at least one impurity from the received liquid component; and
 a closed-loop liquid recycling system coupled to the phase separation device and to the reactor, wherein the closed-loop liquid recycling system receives the liquid component isolated by the phase separation device and recycles a substantial portion of the received liquid component back to the reactor as the recycled liquid component.

11. The system of claim 10, wherein the purification device comprises a reactor for chemical purification.

12. The system of claim 11, wherein the chemical purification comprises introducing calcium hydroxide to the liquid component to form insoluble calcium sulfate.

13. The system of claim 10, wherein the purification device comprises a physical purification device.

14. The system of claim 13, wherein the physical purification device comprises a reverse osmosis device.

15. The system of claim 13, wherein the physical purification device comprises a nanofiltration device.

16. The system of claim 10, wherein the purification device comprises an ion exchange resin.

17. The system of claim 10, wherein the purification device comprises:
 another reactor that mixes calcium hydroxide with the received liquid component; and
 another phase separation device that subsequently removes a resulting calcium sulfate precipitate from the received liquid component before recycling.

18. The system of claim 10, wherein the at least one impurity comprises dissolved sulfates.

19. The system of claim 10, wherein the at least one impurity comprises one or more elements other than lead.

20. The system of claim 10, wherein the phase separation device comprises a belt dryer, a filter press, a clarifier, or a cyclone separator.

* * * * *

UNITED STATES PATENT AND TRADEMARK OFFICE
CERTIFICATE OF CORRECTION

Page 1 of 2

PATENT NO. : 11,005,129 B2
APPLICATION NO. : 16/557699
DATED : May 11, 2021
INVENTOR(S) : Meissner, Jr. et al.

It is certified that error appears in the above-identified patent and that said Letters Patent is hereby corrected as shown below:

On the Title Page

Item [57], Column 2, Line 5, delete "lead-beating" and insert -- lead-bearing --, therefor.

Page 2, item [57], Column 1, Line 4, delete "recycling," and insert -- recycling --, therefor.

In the Specification

Column 2, Line 38, delete "mixture" and insert -- mixture, --, therefor.

Column 3, Line 5, delete "the" and insert -- "the" --, therefor.

Column 3, Line 17, delete "(e.g," and insert -- (e.g., --, therefor.

Column 3, Line 24, delete "(e.g," and insert -- (e.g., --, therefor.

Column 3, Line 36, delete "etc)." and insert -- etc.). --, therefor.

Column 3, Line 67, delete "by products (e.g," and insert -- by products (e.g., --, therefor.

Column 4, Line 17, delete "and," and insert -- and --, therefor.

Column 4, Lines 27-28, delete "putification" and insert -- purification --, therefor.

Column 4, Line 35, delete "grinding," and insert -- grinding --, therefor.

Column 4, Line 65, delete "(e.g," and insert -- (e.g., --, therefor.

Column 5, Line 10, delete "(e.g," and insert -- (e.g., --, therefor.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,005,129 B2

Column 6, Line 5, delete "(e.g." and insert -- (e.g., --, therefor.

Column 6, Line 31, delete "toady" and insert -- leady --, therefor.

Column 7, Line 45, delete "devices" and insert -- devices, --, therefor.

Column 8, Line 26, delete "partide" and insert -- particle --, therefor.

Column 8, Line 60, delete "leaching," and insert -- leaching --, therefor.

Column 8, Line 67, delete "leads" and insert -- leady --, therefor.

Column 9, Line 3, delete "lead," and insert -- lead --, therefor.

Column 10, Line 40, delete "enablimg" and insert -- enabling --, therefor.